(12) United States Patent
Yang

(10) Patent No.: US 6,831,464 B2
(45) Date of Patent: Dec. 14, 2004

(54) AUTOMATIC SURVEILLANT REVOLVING STORAGE BATTERY AUXILIARY CHARGING SYSTEM

(76) Inventor: Tai-Her Yang, 6F-5 No. 250, Sec. 4, Chung Hsiao E. Rd., Taipei (TW)

( * ) Notice: Subject to any disclaimer, the term of this patent is extended or adjusted under 35 U.S.C. 154(b) by 0 days.

(21) Appl. No.: 10/230,143

(22) Filed: Aug. 29, 2002

(65) Prior Publication Data
US 2004/0041568 A1 Mar. 4, 2004

(51) Int. Cl.$^7$ ............................................. G01N 27/416
(52) U.S. Cl. ..................................................... 324/426
(58) Field of Search .............................. 324/426–433; 320/104, 127, 128, 130, 132, 138, 152, 156, 157, 158, 159; 307/10.7; 290/4 A, 4 C, 5 B; 322/14–16, 23; 180/65.8

(56) References Cited

U.S. PATENT DOCUMENTS 5,966,000 A * 10/1999 Yang ............................ 322/23

* cited by examiner

*Primary Examiner*—Pia Tibbits
(74) *Attorney, Agent, or Firm*—Bacon & Thomas, PLLC

(57) ABSTRACT

Automatic Surveillant Revolving Storage Battery Auxiliary Charging System, to compare the value as controlled by an artificial control or the value as set in a central control unit, with a testing signal produced by a battery charge level detector circuit, operating in line with said artificial control or CCU, so as to drive, in a controlled manner, an auxiliary power supply in the form of a D.C. charge converted from an A.C. line feeder, or to drive the engine generator straight, equipped with a variety of operative functions as optional.

9 Claims, 6 Drawing Sheets

AUTOMATIC SURVEILLANT REVOLVING STORAGE BATTERY AUXILIARY CHARGING SYSTEM

BACKGROUND OF THE INVENTION (a) Field of the Invention

The subject automatic auxiliary charging system for a storage battery, including battery charge level surveillance (monitoring), uses an engine generator to supply auxiliary charging power to the battery, in order for the battery to maintain an adequately charged condition, and further to preferentially supply power to a load.

(b) Description of the Prior Art

Conventional batteries, by reason of their portability, compactness, and utility, are frequently used for purposes of emergency power storage, or as a means of power supply to motor driven implements, power driven tooling, or more generally as a D.C. power supply. A disadvantage of such batteries, however, is their relatively short service life, which is exacerbated where a higher output is required. On the other hand, attempts to enlarge the battery in order to increase output inevitably involve unacceptable cost or weight increases. At least some of these disadvantages are overcome by the system disclosed in U.S. Pat. No. 5,966,000, to the inventor, entitled Storage Battery Auxiliary Charging System with Surveillance Functions. The inventor, however, has found through more subsequent R&D efforts that further improvements as regards the performance feature of the system are possible to make the entire system more versatile and compatible with different systems.

SUMMARY OF THE INVENTION

The subject automatic storage battery auxiliary charging system compares a charge value controlled by an artificial control, or the charge value set in a central control unit CCU, with a testing signal produced by a battery charge monitoring circuit operating in line with said artificial control or CCU, so as to drive, in a controlled manner, an auxiliary power supply, which may be in the form of a D.C. power supply converted from a line voltage, or to drive an engine generator directly, the auxiliary charging circuit being equipped with a variety of operative functions as options.

DETAILED DESCRIPTION OF THE PREFERRED EMBODIMENTS

Figure 1:
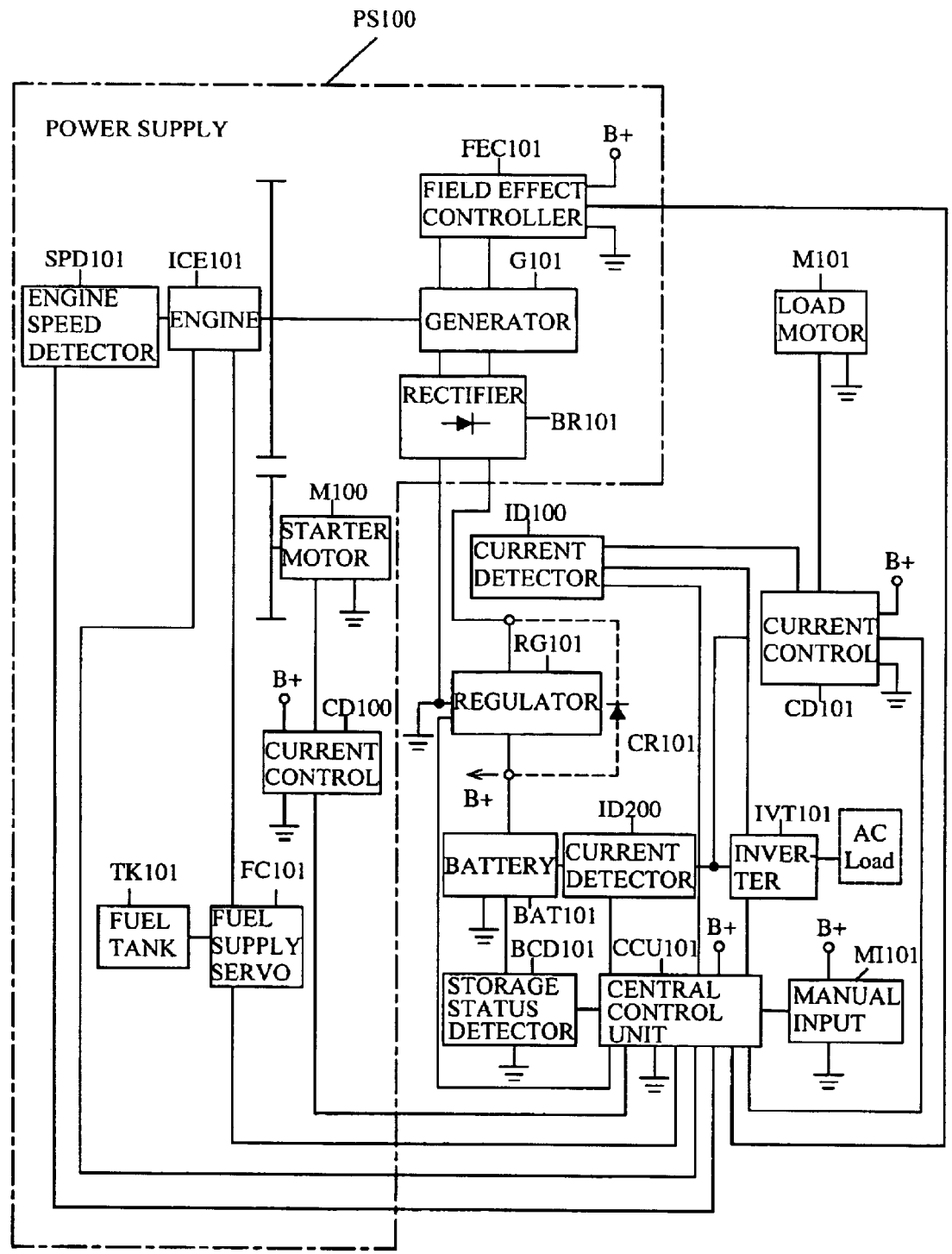
FIG. 1 is a block diagram of the automatic auxiliary charging system of the invention.
Figure 3:
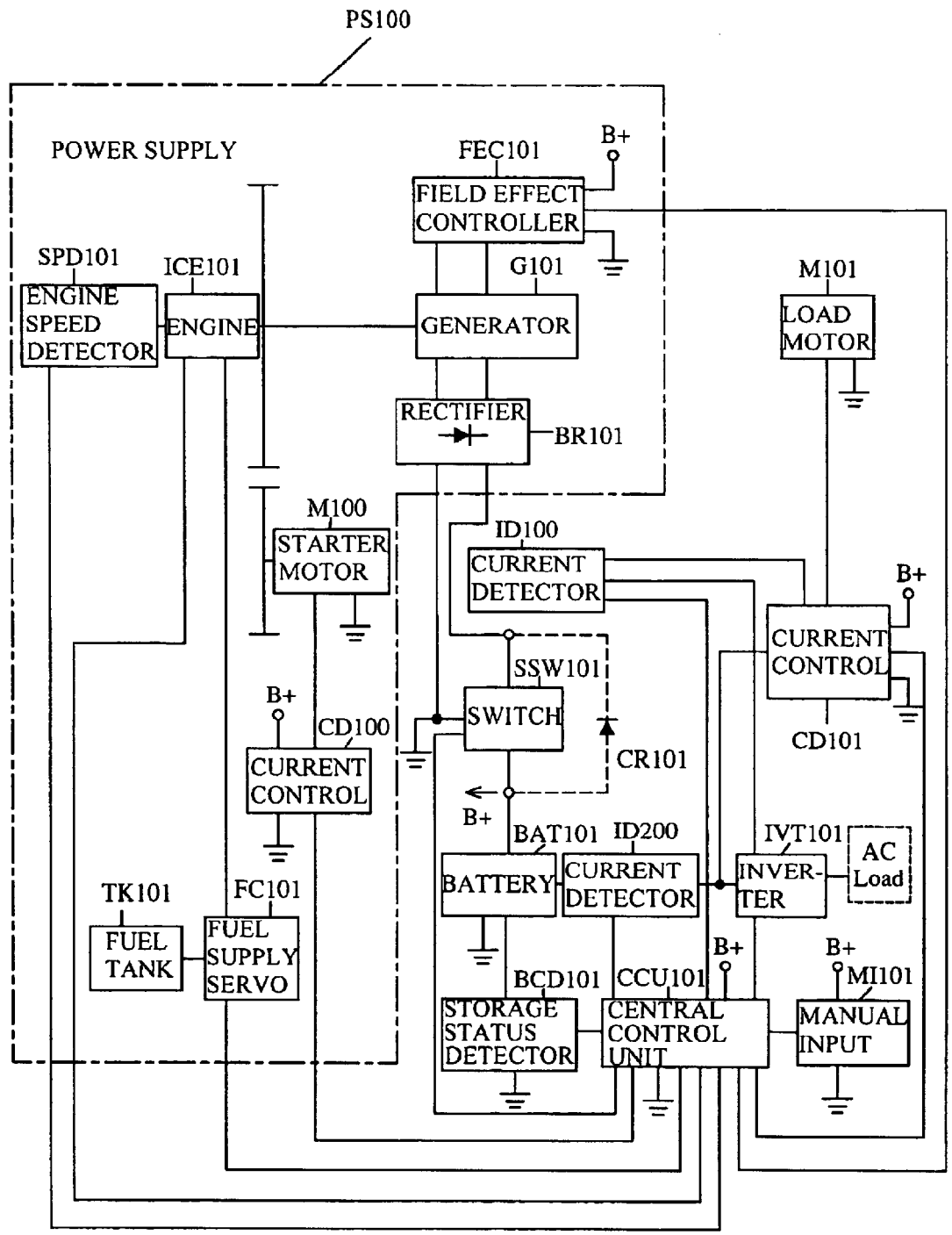
FIG. 3 is a block diagram showing, as incorporated in the invention system, a blocking diode CR101 and operable two-way switch SSW101, meant to control battery potential and power generated.
Figure 4:
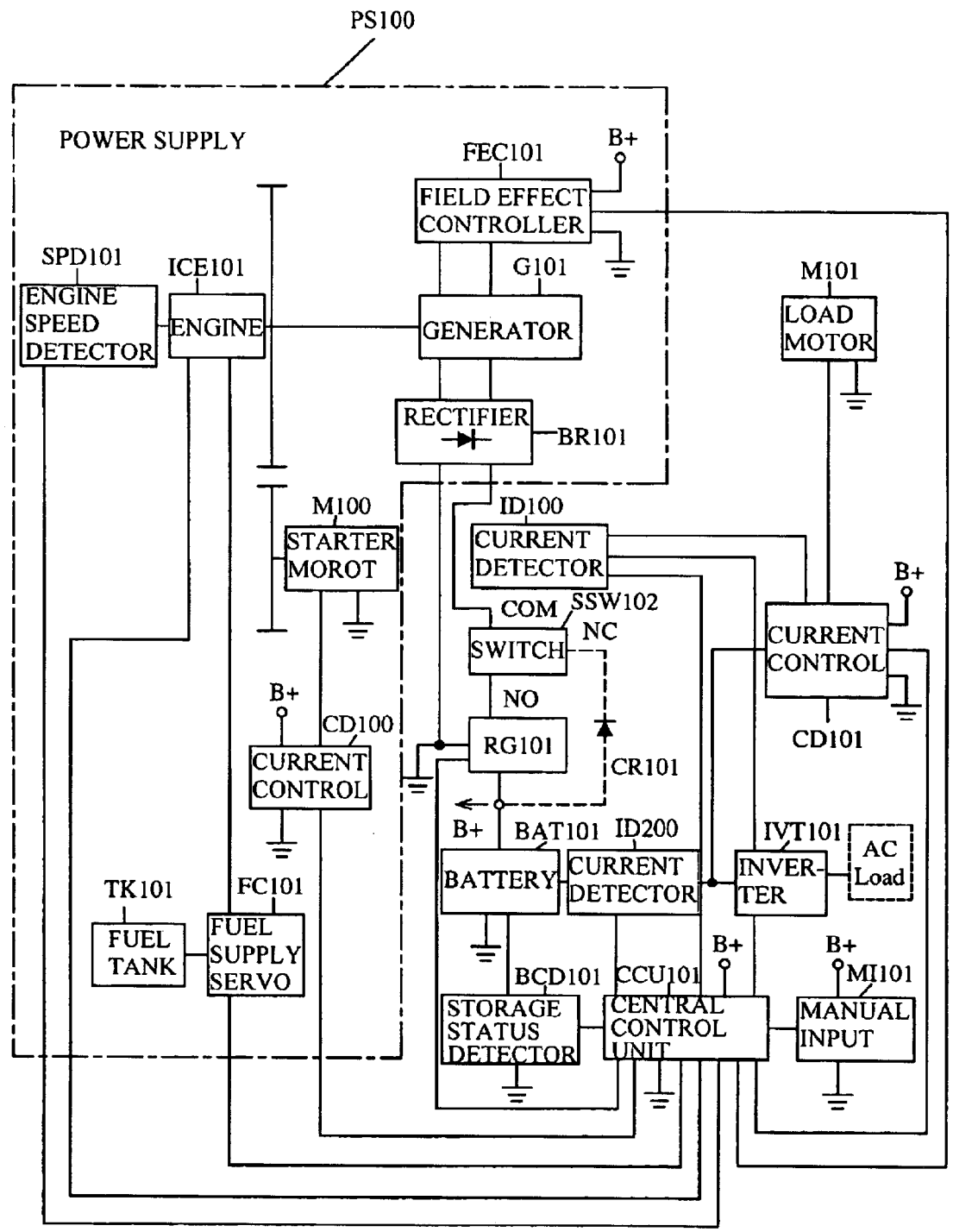
FIG. 4 is a block diagram showing, as incorporated in the invention system, a blocking diode CR101 and regulator RC101 meant to control contact switch SSW102 at point C, and that in turn assumes control of interaction between the battery potential and the auxiliary power supply.
Figure 5:
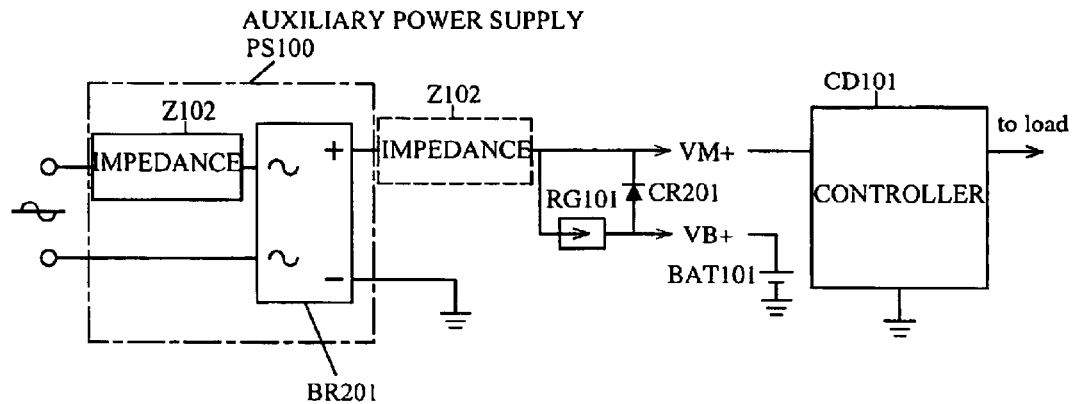
FIG. 5 is a block diagram of the invention as regards the circuit for the auxiliary power supply PS100 which consists of the D.C. charge converted from an A.C. line voltage.
Figure 6:
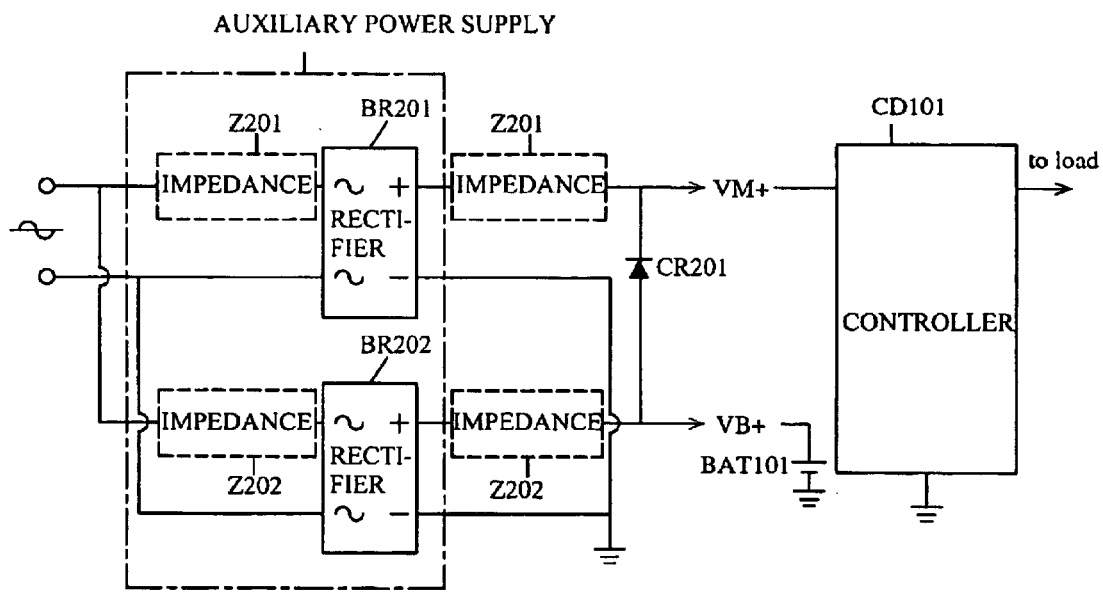
FIG. 6 is block diagram showing the invention defined by an A.C. line voltage and two sets of rectification circuits of equal voltage rating, together with independently installed regulators serving respectively as a motor drive power supply or battery charging power supply.

FIG. 1 is a block diagram of an automatic auxiliary charging system constructed in accordance with the principles of the invention, including:

a battery BAT101 in the form of a secondary battery capable of repeated charging/discharging recycling operation, which can be, for example, a lead acid battery, a battery having a nickel/cadmium, nickel/nitrogen, or nickel/zinc structure, a battery of the lithium system, a zinc system battery, or any other secondary battery, with the battery being irremovably installed in the circuit or alternatively installed by means of a plug or socket assembly or a coupling allowing for rapid assemblage or removal;

a storage status detector BCD101 arranged to conduct continuous or periodical testing or else to convert to digital or analogue power a signal output for comparison using the terminal voltage, internal impedance, volume or weight as a parameter, and to control charging or discharging and prevent static loading errors for correction purposes; the storage status detector including analog comparison circuits incorporating electromechanical or solid state electronic elements, or alternatively digital comparison circuits incorporating a microprocessor, associated software and interface electronic accessories;

a regulator RG101 composed of mechanical or solid state electronic elements, which refers to the output voltage/current of an auxiliary power supply PS100 for providing a D.C. charging capability by conversion from generator G101 or an A.C. line voltage, or by simply following an instruction issued from CCU101, and which feeds back the power rate that is being delivered from the auxiliary power supply PS100 in the form of D.C. charging power converted from the A.C. line voltage or from the generator G101, the regulator also being an optional device subject to system considerations;

an optional current detector ID100 connected to the output terminal of the auxiliary power supply PS100 and which takes the form of a D.C. charging means converted from generator G101 or an A.C. line voltage with current sampling means comprising resistive or conductive elements or a combination of both, but essentially resistive, or a semiconductor voltage drop element, a field strength sensor, or other means of heat accumulation or electromagnetic effect type current detectors capable of yielding current testing values to be converted into analog signals with which to produce an output current for the generator G101 by which to control or regulate the regulator RG101, or else to be fed to CCU101, so as to control in turn the operation condition of generator G101;

an optional detector ID200 connected in series between input/output terminals of battery BAT101 and the drive control CD101 or rectifier IVT101, the optional detector ID200 including current sampling means comprising purely resistive elements or purely conductive elements or a combination of both, or a semiconductor voltage drop element; or alternatively which may be comprised of a device by which analog signals may be produced based on the current determined by means of field strength sensors or heat accumulation or field effect probing units, serving to determine the current coming from or delivered to the battery set and pass the current determination to the drive control CD101 or CCU101 to control the output power rate of the battery BAT101;

as shown in any of FIGS. 1–4, an auxiliary power supply PS100 in the form of a revolving or reciprocating internal combustion engine assembly ICE101 arranged to deliver output of kinetic mechanic energy by the combustion of gasoline, diesel oil, or gas or other form of fluid fuel in combination with an A.C., D.C., brushless or brushed armature assembly, that is, generator G101, which serves to convert the incoming engine revolving kinetic energy into D.C. power, or alternatively to convert A.C. power through rectification at rectifier 13R101 into D.C. power; or alternatively as shown in FIGS. 5 and 6, the same auxiliary power supply PS100 may be executed as a means to convert A.C. line voltage potential into D.C. charging power, serving eventually to drive load motor M101 or other loads, and to charge batteries;

an optional rectifier BR101 for rectifying single phase or multiple phase A.C. power into D.C. power in in case the power supply includes an A.C. generator;

a field excited controller FEC101 composed of mechanical or solid state elements, to control the power generating from an A.C. or D.C. generator comprising field excited windings, basing on generator output status, a manual control device MI101 and CCU101 settings, so as to achieve regulatory control of voltage, current or power rate, this feature to be saved where the generator pole is of a permanent magnet type;

an optional analog or digital engine speed detector SPD101 capable of converting angular displacements into corresponding electric signals in electromagnetic or photoelectric forms so as to feed engine speed signals to CCU101, and consequently regulate the feed of fuel from servo-mechanism FC101 to the engine set, the electric signals fed to the CCU101 alternatively being in the form of an analogous voltage or frequency value of generator G101; the engine speed detector SPD101 alternatively also being in the form of a mechanical structure, such as, for example, a centrifugal testing structure or other mechanical structure, and adapted for mechanical interaction with fuel supply servo-mechanism FC101 so as to bring engine set ICE101 into fixed speed rotation depending on the nature of the system involved and on system requirements;

a starter motor M100 composed of a synchronous or asynchronous, A.C. or D.C., brushed or brushless, electromagnetic structure to receive input power so as to produce revolving power to initiate motion in turn of the engine set ICE101, this being an optional feature dependent on system requirements;

Fuel supply servo-mechanism FC101 arranged to receive electric power servo instructions or alternatively mechanical interaction and structured so as to control the fuel supply to engine set ICE101, and in turn to regulate rotation speed and torsion on the part of engine set ICE101, this being an optional feature contingent upon system requirements;

Fuel tank TK101 where engine fuel is stored, to control fuel supplied to engine set ICE101 by means of fuel line and fuel supply servo-mechanism FC101 interconnected there between, this being an optional feature;

Drive control CD100 comprising essentially mechanical or solid state power elements and associated circuits, to drive starter motor M100 into operation or else to stop its operation, this being an optional feature dependent upon system requirement, or contingent upon circuit configurations;

Drive control CD101 composed of mechanical or solid state elements and relevant circuits, to control the load motor M101 for forward/reverse rotation, speed regulation, startup and stop setting, in respect of which the quantity to be supplied per item is dependent upon system requirements, this feature, on the whole, also being optional depending upon system requirements;

a load motor M101 composed of an A.C. or D.C., brushed or brushless, synchronous or asynchronous motor, and adapted for forward rotation, reverse rotation, speed regulation, operation and stoppage and like functions so as to transmit power to a load, the load motor M101 alternatively being in the form of another load and installed according to system requirements;

an auxiliary power supply B+ with power sourced to battery BAT101, with an additionally provided battery set serving as the auxiliary power supply, or as derived from a generator for supplying power to the central control unit CCU101, manual control device MI101, drive control CD101 for load motor M101, drive control CD100 for starter motor M100, field excited control FEC101, regulator RG101, or other devices such as lighting facilities for actuation; the generator additionally being furnished with corresponding power windings based on required voltage and current capacities to facilitate charging of the auxiliary battery, this feature being an option contingent on system requirements;

a D.C. to A.C. inverter IVT101 composed of solid state power rate elements and associated circuits, to convert D.C. power into A.C. power so as to drive A.C. loads, in respect of which the quantity to be supplied is contingent upon system requirements;

a central control unit CCU101 composed of mechanical or solid state elements which form alternatively an analog or digital structure or combined analog and digital structures; or a micro-processor comprising operation and control software, D-A and A-D converters or other associated circuit elements, with control modes established internally basing on instructions given by manual control device MI101 or on feedback signals, so as to control and manipulate interactions between the system generator G101, the auxiliary power supply PS101 in the form of a D.C. charge converted from an A.C. line feeder, the battery BAT101 and the load motor M101 or other load, and the operation of other relevant installations as well; this being an optional feature contingent upon system requirements;

a manual control device MI101 composed singly of analog or digital mechanical or solid state elements separate from or else in combination with each other, for feeding to the central control unit so as to control the overall system operation, in respect of which the quantity to be installed is dependent upon system requirements; and for that reason is an optional feature.

Figure 2:
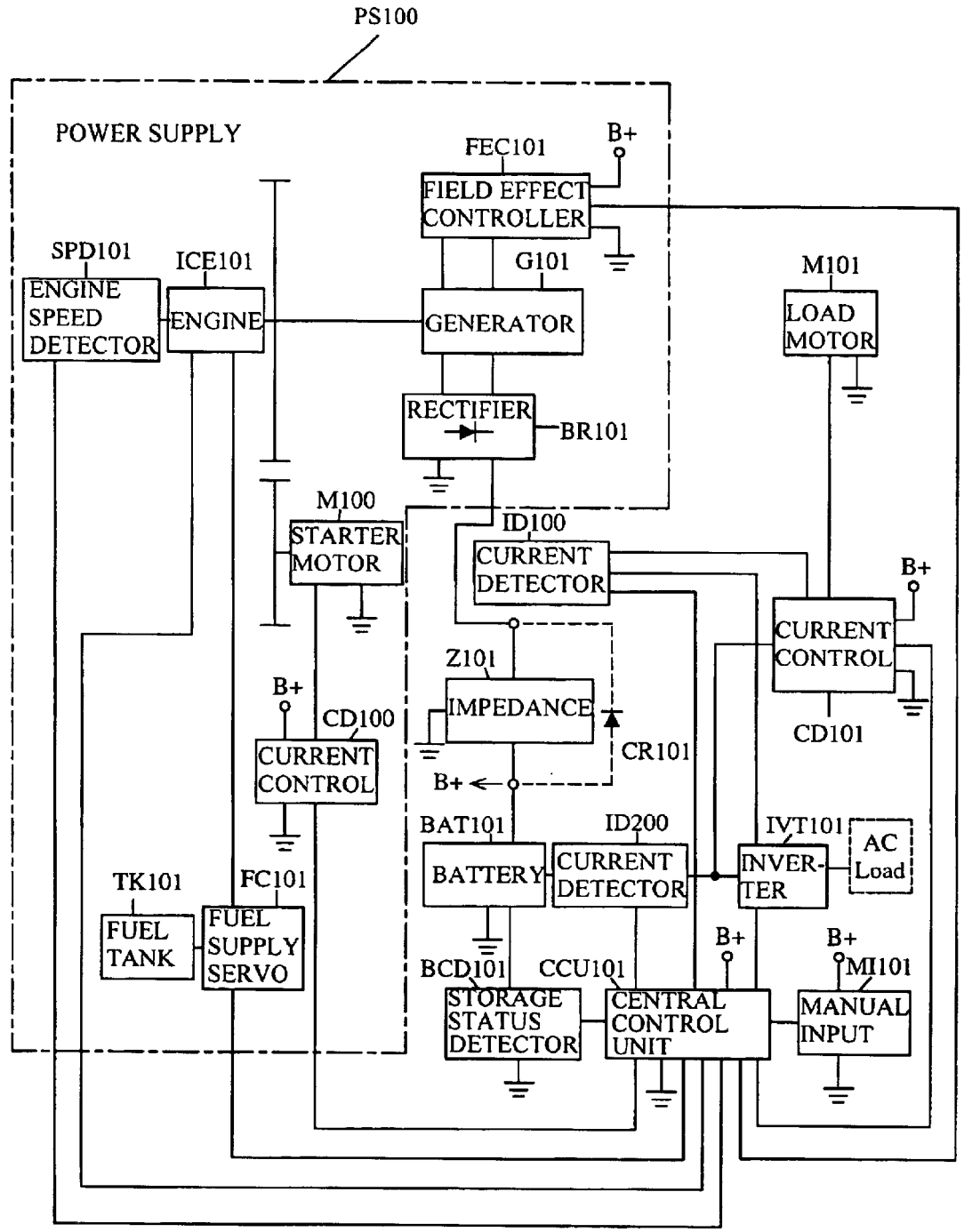
FIG. 2 is a block diagram of the invention system illustrated with a blocking diode CR101 and blocking element Z101 both provided to control battery potential and power generated.

The invention as described above is designed essentially to maintain a storage battery in an adequately charged condition by using as its power supply an engine generator, or alternatively an auxiliary power supply PS100 in the form of D.C. charging current converted from an A.C. line feeder, and to offer timely auxiliary power supply to a load motor or other loads or portable batteries. In operation, testing measurement is made, based on manual control modes, or else on modes of a central control unit programmed for the purpose of taking battery storage conditions into account, whereby a circuit testing signal value is compared with the aforementioned controlled or setting value to bring about proportionate, controlled operation of the engine driven generation set or the auxiliary power supply PS100 in the form of D.C. charge converted from an A.C. line feeder, incorporating optionally various functions including any or all of the following:

(1) When the system is not actuated to drive a load, and the battery saturation status has been confirmed to drop to a level below a prescribed threshold, the engine startup motor must be activated manually or electrically and that in turn will cause the engine and generator set to charge the battery alone, or the charging may alternatively be carried out by using an A.C. line system, with charging being suspended once saturation is reached in the battery;

(2) To drive a load, a comparison is made of the saturation status of the battery in reference to the operation model set in the CCU, after which the generator is regulated, or alternatively, the auxiliary power supply PS100 is operated to deliver a constant or controlled current output power or a constant or controlled rated power, such that once the power required by the load exceeds the auxiliary power supply PS100, power required by the load motor or other load will be jointly met by power supplied from the auxiliary power supply and the battery; and where power required by the load is less than power that can be supplied by the auxiliary power supply PS100, the latter way feed power to the load and feed surplus power to the battery at the same time, and once the load is augmented in this manner to a level exceeding the power rating of the auxiliary power supply PS100, the system will shift automatically to operate in accordance with function (3), while again returning to rated power functioning when the rated power on the load is inferior to that of the auxiliary power supply PS100;

(3) To run a power output under a fixed or controller current condition, or a fixed or controlled power condition, from the generator or from the auxiliary power supply PS100 in the form of D.C. charge converted from an A.C. line system, controlled as a function of the level of saturation detected of the battery, in order for the auxiliary power supply PS100 and battery to jointly activate the load motor or other load pursuant to proportionate apportionment respecting the auxiliary power supply PS100 against the load power factor, or as regards current compatibility, such that when the load is downgraded or the load power factor falls below the power factor of the auxiliary power supply PS100, the system will shift to operate according to function (2), so that power will still be available as usual for operation;

(4) The load current status of the load motor when driven by the battery alone is verified, such that once the power factor of the load motor or other loads rises to a level beyond the set value or beyond the set time, the auxiliary power supply PS100 will effect a constant current or controlled current output, or instead effect a constant power factor or controlled power factor output, as a function of the control model having been set in the CCU, in an effort to drive the load in coordination with the battery, so that the auxiliary power supply PS100 may continue to deliver output of power to the load motor or another load once the power factor on the part of the load motor or of another load resumes a normal level;

(5) The ability to drive engine and generator may be driven together in response to manipulation of the manual control assembly extends to the ability to drive an auxiliary power supply PS100 in the form of a D.C. charge converted from an A.C. line system, and the ability further includes independent driving of a load motor or other load by the output power from the same auxiliary power supply PS100, and the same output power together with battery power to jointly drive a load in the event the load in the load motor is increased, so that output power from the auxiliary power supply PS100 continues to be delivered to the load when the battery stops outputting once the motor load resumes a normal mode of operation;

(6) Manipulation from the manual control unit may be used to activate the engine and generator or an auxiliary power supply PS100 in the form of D.C. charge converted from an A.C. line system for a fixed current or controlled current output, or instead for a constant power factor or controlled power factor output, whereby proportionate apportionment is executed respecting the load power factor vis-a-vis current charge to drive the load motor and to charge the battery, such that the mode of operation will automatically shift to function (7) once the load is increased to a level beyond the charging power supply power factor, but switch back to the present mode of operation in the negative case;

(7) Manipulation of the manual control unit may also be used to initiate engine and generator operation or operation of an auxiliary power supply PS100 in the form of D.C. charge converted from an A.C. line system, for fixed current, controlled current, fixed power rating, or controlled power rating mode output in appropriate apportionment vis-a-vis the battery basing on generation power factor or loading power factor or current differential between both, whereby the auxiliary power supply PS100 together with the battery takes charge of the driving of the load motor or other loading, such that the system shifts automatically to function (6) once the load is alleviated such that the rated loading power drops below the rated power of the auxiliary power supply PS100, but resumes operating under this function in the negative case;

(8) Manipulation of the manual control unit may also be used to initiate engine and generator operation or operation of the auxiliary power supply PS100 in the form of D.C. charge converted from an A.C. line feeder for independent charge with respect to the battery;

(9) Charging is stopped once the battery has reached predetermined saturation level as detected in the course of charging operation described under functions (1) and (8) herein before;

(10) Charging is stopped with respect to the battery without affecting power output being delivered from the auxiliary power supply PS100 to the motor or other load through manipulation of either the manual control unit or of the central control unit once the battery reaches a predetermined level in the course of operation pursued under function (2) and (6) described here in before;

(11) Charging is stopped with respect to the auxiliary power supply PS100 concurrent with power being output to the motor or other load way from the battery by means of manual mode control or CCU control once the battery has reached a predetermined saturation point as detected in the course of operation pursued under function (2) and (6) described herein before;

(12) The engine generator assembly or the auxiliary power supply PS100 continues operation while the battery switches from a charging state into feeding, in a joint effort with the auxiliary power supply PS100, power to the motor or other load, through manual control or central control unit control, once the battery has just reached a predetermined saturation level detected in the course of a charging operation described pursuant to function (2) and (6) herein before;

When the invention as described above is operating pursuant to function (2) and (6), with power output of the generator G101 or else released from the auxiliary power supply PS100 in the form of D.C. charge converted from an A.C. line feeder connected directly in parallel with the battery BAT101, a disparity in battery saturation status will have the effect that generator G101 produces a surge in charging current with respect to battery BAT101 so long as the battery remains at a relatively lower capacity level, in which case it is desirable to operate by means of the following control circuits comprising:

A blocking diode CR101 is connected in forward series to battery BAT101, to thence form a parallel output with the D.C. output terminal straight of generator G101, with the D.C. output terminal resulting from rectification of an A.C. source, or with the auxiliary power supply PS100 in the form of D.C. charge converted from an A.C. line feeder, the regulator RG101 being connected in parallel across both ends of the diode CR101 so that RG101 is made active to regulate power that is charged from the generator or alternatively from the auxiliary power supply PS100 in the form of D.C. charge converted from an A.C. line feeder to the battery; and RG101 may be further adapted to be a receptor to control signals emitted from CCU101 based on the testing result from battery storage detector BCD 101 so as to allow for regulation of charging rates or currents, and for control of startup or stopping of charging functions;

FIG. 1 shows the above-mentioned arrangement for a blocking diode CR101 to be connected in forward series to battery BAT101, to thence form a parallel output with the D.C. output terminal straight of generator G101 or alternatively with the D.C. output terminal resulting from rectification of an A.C. source, or with the auxiliary power supply PS100 in the form of D.C. charge converted from an A.C. line feeder;

Alternatively, the blocking diode CR101 may be serially forwardly connected to the battery BAT101, to thence form a parallel output with the D.C. output terminal straight of generator G101 or alternatively with the D.C. output resulting from rectification of an A.C. source, or with the auxiliary power supply PS100 in the form of D.C. charge converted from an A.C. line feeder, and further connected in parallel with (as shown in FIG. 2) an impedance element Z101 which is essentially resistive or conductive or a combination of both, to replace the function of the regulator RG101, to thereby restrict the current that is being released from the auxiliary power supply PS100 into the battery;

The blocking diode CR101 may also be serially forwardly connected to the battery BAT101 as described above and further connected in parallel with an electromechanical or solid state controllable two-way switch SSW101, such as is shown in FIG. 3, to allow for on/off control of the outputs of both the battery BAT101 and the auxiliary power supply PS100 in substitution for the function of the regulator RG101, and eventually serving to control the output of generator G101 or the auxiliary power supply PS100 in the form of D.C. charge converted from an A.C. line feeder, as illustrated in FIGS. 5 and 6 (described in more detail below) supplied to the battery BAT101, the charging state of said battery BAT101 being determining its output with respect to the load motor M101;

The arrangement for a blocking diode CR101 together with a regulator RG101 or an impedance element Z101 bearing similar functions or a controllable two-way switch SSW101 to be made in forward series with the output of the battery BAT101, so that the D.C. power that is supplied by the generator G101, or else by the auxiliary power supply PS100 in the form of D.C. charge converted from an A.C. line feeder, the output of the diode CR101 that is in forward series with the battery BAT101, and the output of the regulator RG101 or of the impedance element bearings similar functions Z101 or still of the controllable two-way switch SSW101, are of like polarity and this triplicate point is made in common with a switch SSW102 composed of electromechanical or solid state elements, as shown in FIG. 4, on which the point C is controllable, with one end of the auxiliary power supply PS100 being connected to the common point (COM) on the switch SSW102 featuring a controllable point C, and with the output of the diode CR101 and the input of the regulator RG101 being selectively, as per circuit requirements, connected to the normally open (NO) point or normally closed (NC) point on the switch SSW102 featuring a controllable point C, so as to control, by means of the auxiliary power supply PS100, the charging state of the battery, on one hand, and of the output state on the part of the battery with respect to the load motor M101 or other loads, on the other hand.

The battery wherever mentioned herein before, is executed where appropriate, either fixed as an installation in a circuit, as a mobile, removable installation in a plug/socket assembly, or otherwise in combination form associated with the primary circuit, featuring: (1) charging of the battery BAT101 in A.C. to D.C. mode; (2) charging of the battery BAT101 by D.C. converted from A.C., and the same current as input of power to the load; (3) charging of the battery BAT101 by D.C. converted from A.C. and the same current by way of the battery BAT101 delivering power to the load; (4) the battery BAT101 singly delivering power eventually to the load; (5) the battery BATIO1 functioning as a filter, whereof that output terminal going to the load side is optionally equipped with a drive control CD101 serving to control output voltage or output current or output polarity or serving to protect in the event of an overloading condition, by activating the associated control circuits.

As illustrated in FIG. 5, it will be appreciated that the incoming A.C. power source, which has passed through serial impedance means or wave interceptor circuit Z201, and hence the rectifier BR201, serves forthwith as the power supply VM+ to the motor or other load, on the one hand, and as the charging power supply VB+ to battery BAT101 by way of serial connection of a regulation means on the other hand, both power supplies making up the auxiliary power supply PS100, with the impedance means or wave interceptor circuit Z201 in series with the A.C. side or the D.C. output side serving the purpose of current restriction, whereas the regulator RG101 in series with the D.C. output of the auxiliary power supply, constituted by analog or wave interceptor circuits, serves to restrict charging current to the battery BAT101, of which the positive output terminal VB+ is fed to the power side VM+ of the motor by way of a forward, serially connected diode CR201, the battery featuring: (1) charging of the battery BAT101 the A.C. to D.C. mode; (2) charging of the battery BAT101 by D.C. converted from A.C., and the same current as input of power to the; (3) charging of the battery BAT101 by D.C. converted from A.C. and the same current by way of the battery BAT101 delivering power to the load; (4) the battery BAT101 singly delivering power eventually to the load; (5) the battery BAT101 functioning as a filter, whereof that output terminal to the load side is optionally equipped with a drive control CD101 serving to control output voltage, output current, or output polarity, or serving to provide protection in the event of an overloading condition, by activating the associated control circuits.

FIG. 6 shows an embodiment of the invention which has a line voltage A.C. line source and two sets of rectification circuits, plus independently installed regulators serving as a motor drive power supply or battery charging power supply. This embodiment includes two sets of auxiliary power supplies in the form of D.C. charge converted from A.C. source by way of rectifiers BR201 and BR202, with one set serving as the charging power supply VM+ to the motor or other load, on the one hand, and as the charging power supply VB+ to the battery BAT101, and with the rectifier BR201 connected through a serial connection of impedance means or wave interceptor circuit Z201 to the incoming A.C. source, to restrict charging current to the motor or other loads. The rectifier BR202 is similarly connected through a serial connection of impedance means or wave interceptor circuit Z202 to the A.C. source, so as to restrict charging current to the battery BAT101, the positive output terminal VB+ being connected in forward series with a diode CR201, leading to the power side VM+ of the motor; and the impedance means or wave interceptor Z201, Z202 being useful not only for installation way between the incoming A.C. source and the rectifiers BR201, BR202, but also for serial connection to the D.C. input terminal of rectifiers BR201, BR202, where appropriate. The A.C. source is a single phase or multiple phase source for direct input or for input through a transformer. The battery is executed in the manner described above in connection with FIG. 5.

Figure 7:
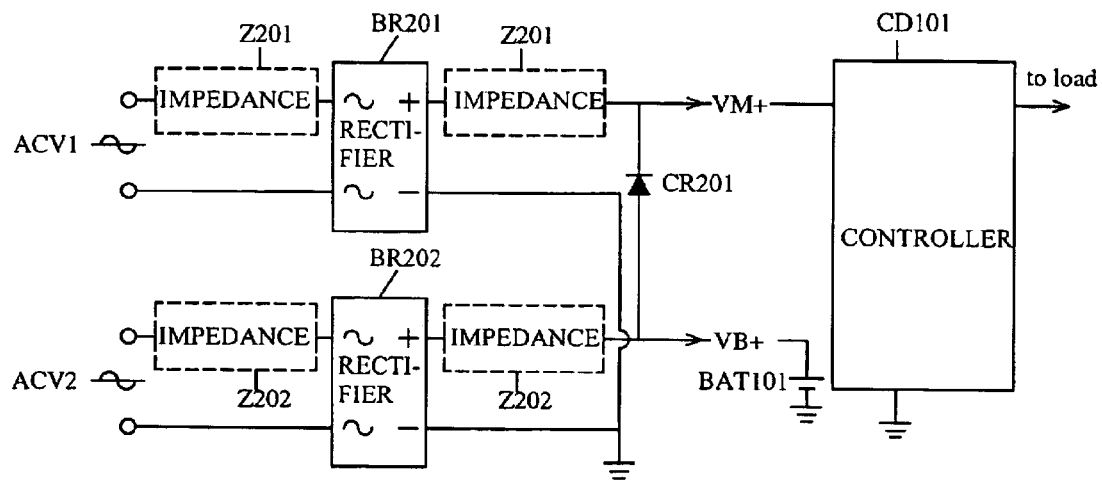
FIG. 7 is a block diagram of the invention including a circuit for an A.C. line voltage and two sets of rectification circuits of dissimilar voltage ratings, plus individual regulators serving respectively as a motor drive power supply or battery charging power supply.

A block diagram showing the invention embodied by different voltage sources, individual rectifiers and individual regulators to account for a motor driving power supply or battery charging power supply is given in FIG. 7, in which are represented circuit schematics for the supply of different A.C. voltage by way of two independent secondary or tap winding sets, directly or through a transformer complete with two sets of rectifier circuits and exclusively independent regulators by which the motor driving power supply and the battery charging power supply are governed; as shown in FIG.7, there are two sets of auxiliary power supplies in the form of D.C. charge converted from A.C. source by way of rectifiers BR201, BR202, with one set serving as the power supply to the drive motor or other load, designated VM+, and the other set accounting for the power supply VB+ to charge battery BAT101, with the rectifier BR201 being connected through a serial connection of the impedance means or wave interceptor circuit Z201 to the incoming A.C. source, to restrict charging current to the motor or other loads. The rectifier BR202 is connected through a serial connection of the impedance means or wave interceptor circuit Z202 to the A.C. source, so as to restrict charging current to the battery BAT101 the positive output terminal VB+ being connected in forward series with a diode CR201, leading to the power side VM+ of the motor. The impedance means or wave interceptor 2201, Z202 are suited not only for installation between the incoming A.C. source and the rectifier BR201, BR202, but also for serial connection to the D.C. input terminal of rectifiers BR201, BR202 where appropriate. The A.C. source is a single phase or multiple phase source for direct input or input through a transformer, the battery being implemented in the manner described above in connection with FIGS. 5 and 6.

As a result of the above-described invention, it is possible to put the storage battery in a power storage condition that is better and more desirable than what is possible heretofore, serving not only to assist in the operation of a loading system, but also to avoid over-discharging the storage battery, thus achieving the ultimate goal of prolonging service life of the battery assembly as a whole.

What is claimed is:

1. An automatic auxiliary charging system for a storage battery, comprising:

a battery capable of repeated charging/discharging recycling operations;

a storage status tester arranged to detect a charging or discharging status of the battery;

an auxiliary power supply; and a load, wherein when the storage status tester detects that a charge on said battery has dropped below a prescribed threshold, the auxiliary power supply charges the storage battery, wherein driving of the load is carried out by the auxiliary power supply alone, the auxiliary power supply and the battery jointly, or the battery alone depending on the charging status of the battery.

2. An automatic auxiliary charging system for a storage battery as claimed in claim 1, wherein the auxiliary power supply includes a generator driven by an engine.

3. An automatic auxiliary charging system for a storage battery as claimed in claim 1, wherein the auxiliary power supply includes an AC line source converted to DC by a rectifier.

4. An automatic auxiliary charging system for a storage battery as claimed in claim 1, further comprising a current detector and control circuit for controlling a current or power output of the auxiliary power supply in response to detection of said charging status of the battery.

5. An automatic auxiliary charging system for a storage battery as claimed in claim 1, wherein distribution of power from the auxiliary power supply to the battery and load, and from the battery to the load, is achieved by a current control.

6. An automatic auxiliary charging system for a storage battery as claimed in claim 1, wherein distribution of power between the auxiliary power supply, the battery, and the load is achieved by a combination of at least two of the following: a forward series connected diode, a voltage regulator, and an impedance.

7. An automatic auxiliary charging system for a storage battery as claimed in claim 1, wherein distribution of power between the auxiliary power supply, the battery, and the load is controlled by a digital central control unit.

8. An automatic auxiliary charging system for a storage battery as claimed in claim 1, wherein the auxiliary power supply includes two rectifiers, one of which supplies power to the load and one of which supplies power to the battery.

9. An automatic auxiliary charging system for a storage battery as claimed in claim 8, further comprising a diode connected between respective outputs of the two rectifiers to control supply of power from the battery to the load.

* * * * *